United States Patent
Pursifull

(10) Patent No.: US 11,390,254 B2
(45) Date of Patent: Jul. 19, 2022

(54) TRAILERING ASSIST SYSTEM FOR TRAILERS WITH RETRACTABLE DROP LEG

(71) Applicant: FORD GLOBAL TECHNOLOGIES, LLC, Dearborn, MI (US)

(72) Inventor: Ross D. Pursifull, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 793 days.

(21) Appl. No.: 16/356,179

(22) Filed: Mar. 18, 2019

(65) Prior Publication Data

US 2020/0298643 A1  Sep. 24, 2020

(51) Int. Cl.
| | | |
|---|---|---|
| B60S 9/22 | (2006.01) | |
| B60S 9/14 | (2006.01) | |
| G06V 10/70 | (2022.01) | |
| B60R 1/00 | (2022.01) | |
| B60D 1/66 | (2006.01) | |

(52) U.S. Cl.
CPC ............ *B60S 9/22* (2013.01); *B60R 1/00* (2013.01); *B60S 9/14* (2013.01); *G06V 10/70* (2022.01); *B60D 1/665* (2013.01); *B60R 2300/808* (2013.01)

(58) Field of Classification Search
None
See application file for complete search history.

(56) References Cited

U.S. PATENT DOCUMENTS

| | | |
|---|---|---|
| 3,768,088 A | 10/1973 | Risius |
| 9,374,562 B2 | 6/2016 | Trombley et al. |
| 9,963,004 B2 | 5/2018 | Lavoie |
| 2009/0184490 A1* | 7/2009 | Alguera ............ B62D 53/125 280/420 |
| 2011/0073821 A1 | 3/2011 | Nirenberg |
| 2017/0002547 A1* | 1/2017 | Omote ................. E02F 9/264 |
| 2022/0067963 A1* | 3/2022 | Fendt ..................... G06T 7/74 |

FOREIGN PATENT DOCUMENTS

WO  WO-2014186828 A1 * 11/2014 ............ B62D 53/08

* cited by examiner

*Primary Examiner* — Rebecca A Volentine
(74) *Attorney, Agent, or Firm* — Frank L. Lollo; MacMillan, Sobanski & Todd, LLC

(57) ABSTRACT

A motor vehicle includes apparatus for towing a trailer with a retractable drop leg. A backup camera captures a detection image with a field of view including the trailer. A vehicle controller detects an initiation of driving with the trailer being connected. A pattern memory prestores at least one image pattern indicative of an extended position or a retracted position of the drop leg. An image scanner receives the detection image when the initiation of driving is detected, wherein the image scanner compares the detection image and the at least one image pattern to detect whether the drop leg is in the extended position. A notification device responsive to the image scanner alerts a driver if the extended position is detected.

20 Claims, 8 Drawing Sheets

US 11,390,254 B2

TRAILERING ASSIST SYSTEM FOR TRAILERS WITH RETRACTABLE DROP LEG

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a trailer assist system for a vehicle, and, more specifically, to a warning system to prevent driving of a vehicle to tow a trailer with a retractable drop leg in an extended position.

The use of vehicles equipped with a trailer hitch to tow a trailer (e.g., a trailer carrying a recreational watercraft or a cargo trailer) is a common practice. The use of a trailer, however, involves several important tasks to properly connect and configure the trailer before initiating driving of the vehicle.

Many trailer designs include a drop leg (i.e., landing gear) to support the front end of the trailer to keep the trailer tongue and coupler elevated above the ground. The drop leg may often include a wheel to allow the trailer to be rolled into position for coupling or for rolling away from the vehicle after towing.

When coupling a trailer to a vehicle in preparation for towing, one of the last steps to be performed is raising (i.e., retracting) the drop leg. A problem occurs when the user forgets to raise the drop leg, resulting in potential damage to the drop leg or other portions of the trailer.

SUMMARY OF THE INVENTION

In one aspect of the invention, a vehicle apparatus is adapted for towing a trailer with a retractable drop leg. A backup camera captures a detection image with a field of view including the trailer. A vehicle controller detects an initiation of driving with the trailer being connected. A pattern memory prestores at least one image pattern indicative of an extended position or a retracted position of the drop leg. An image scanner receives the detection image when the initiation of driving is detected, wherein the image scanner compares the detection image and the at least one image pattern to detect whether the drop leg is in the extended position. A notification device responsive to the image scanner alerts a driver if the extended position is detected.

DETAILED DESCRIPTION OF PREFERRED EMBODIMENTS

Figure 1:
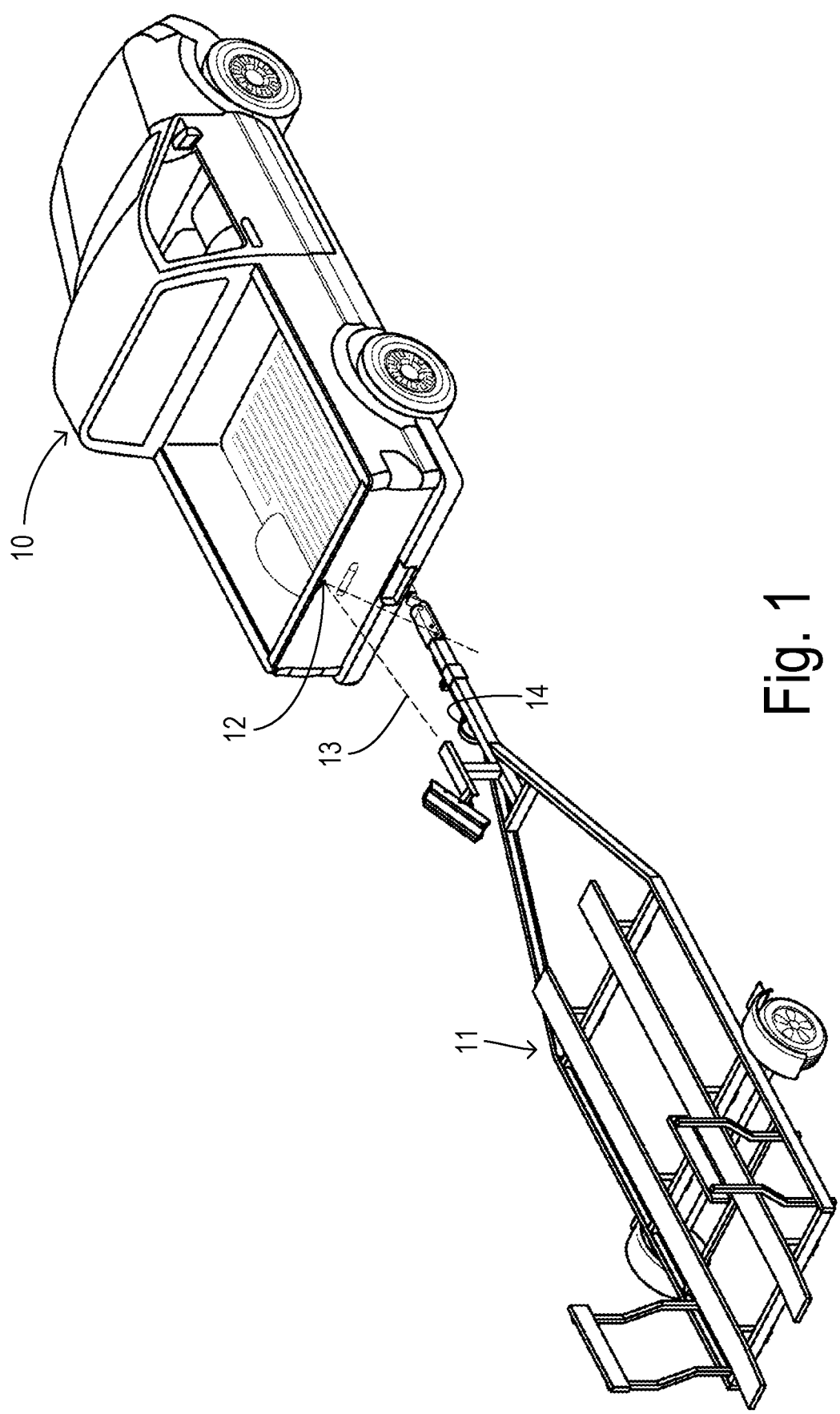
FIG. 1 is a perspective view of a vehicle and an attached trailer having a drop leg in a retracted position.

FIG. 1 shows a vehicle 10 coupled to a trailer 11 for towing. Trailer 11 is positioned for viewing by a backup camera 12 on vehicle 10 which provides a camera field of view 13. A drop leg 14 of trailer 11 appears within field of view 13.

Figure 2:
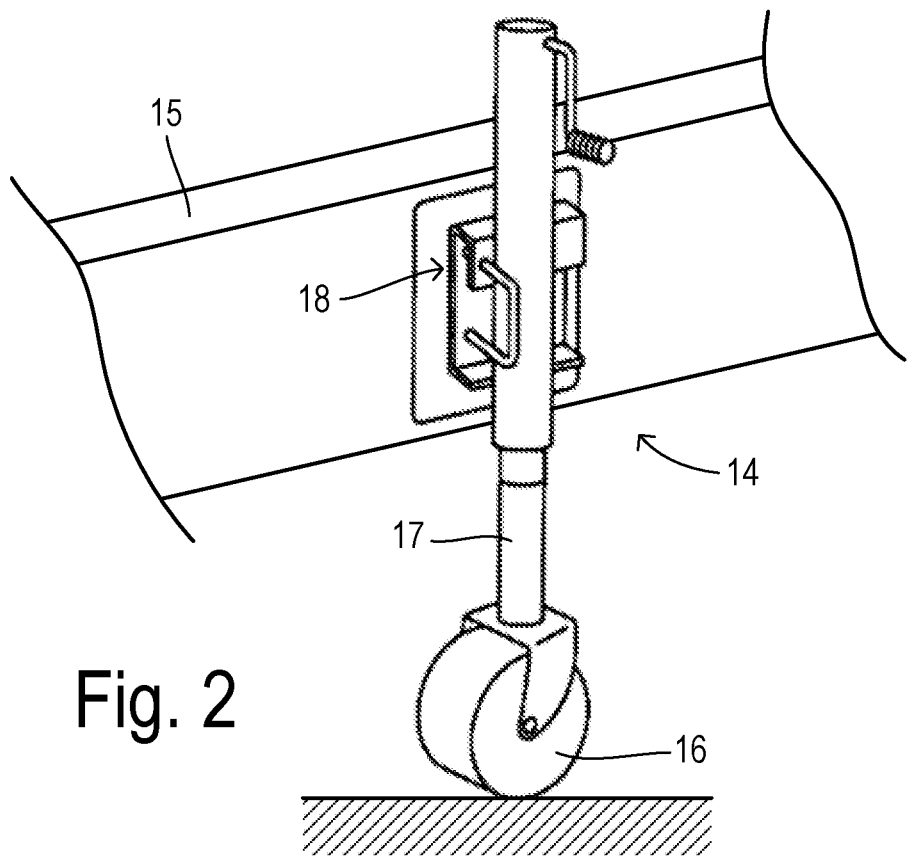
FIG. 2 is a perspective view showing the drop leg in an extended position in greater detail.
Figure 3:
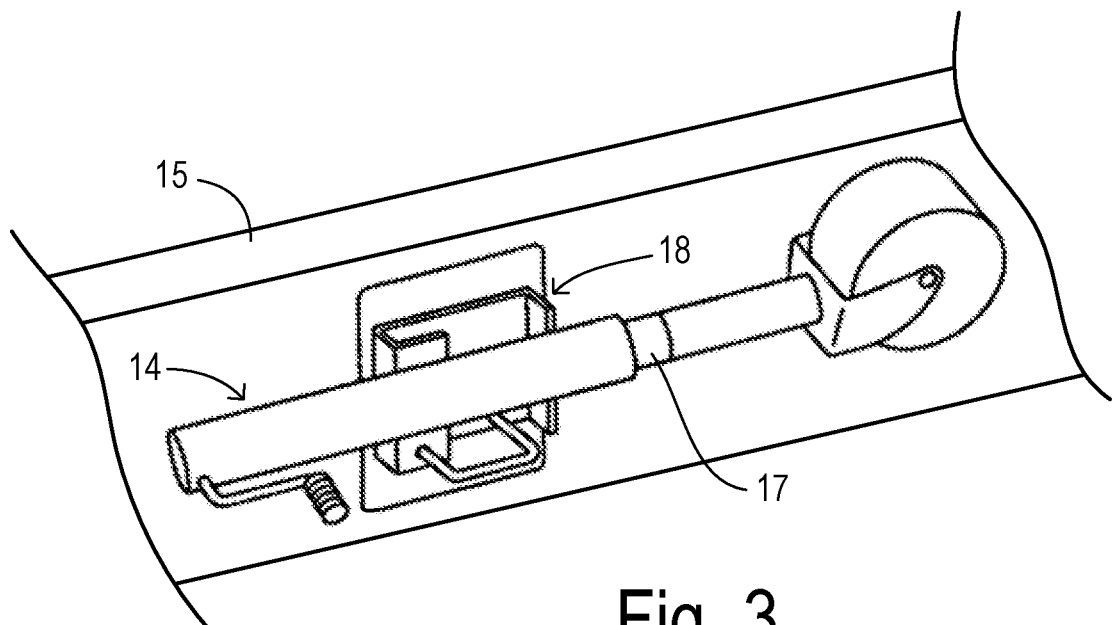
FIG. 3 is a perspective view of the drop leg of FIG. 2 in a retracted position.

FIG. 2 shows one typical type of drop leg 14 attached to a side rail 15 of trailer 11. A drop-leg wheel 16 is mounted to a variably-extending leg member 17 which attaches to rail 15 via a pivot mechanism 18. FIG. 2 shows the extended position wherein wheel 16 contacts the ground for providing support for trailer 11. FIG. 3 shows the retracted position of drop leg 14 wherein the pivot mechanism 18 has been rotated such that leg member 17 is parallel with the ground.

Figure 4:
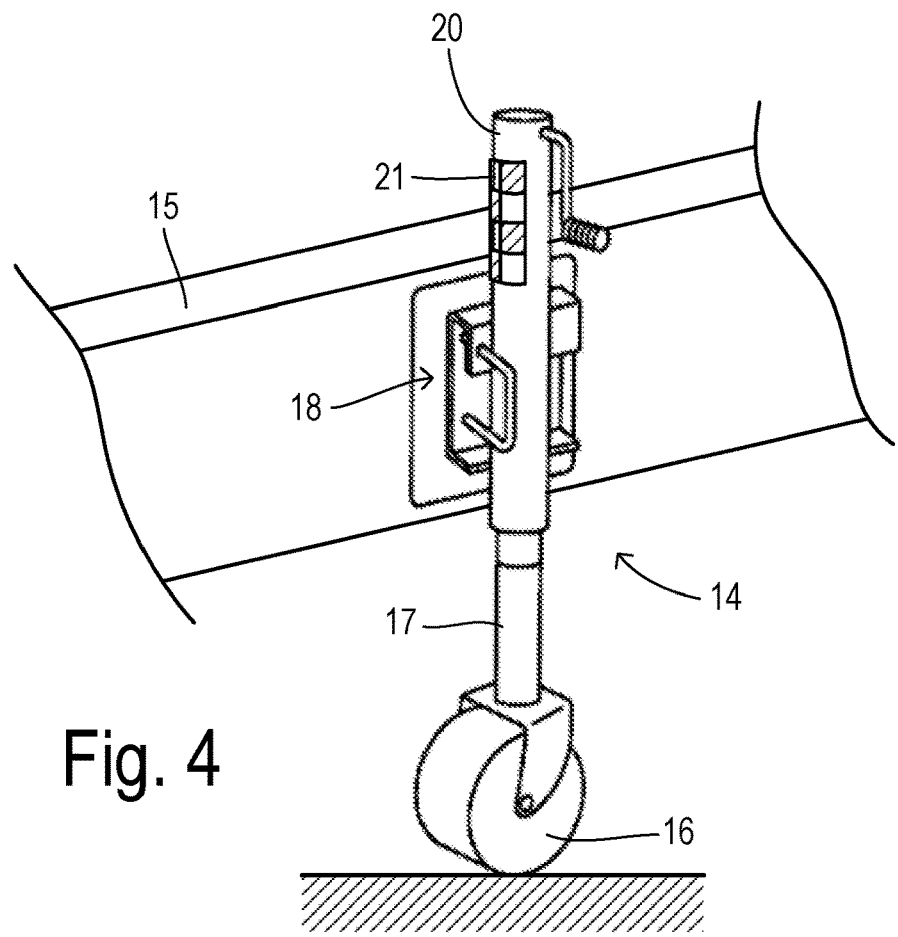
FIG. 4 is a perspective view of the drop leg of FIG. 2 in the extended position and having a marking pattern in a location visible to a backup camera of the vehicle only when in the extended position.
Figure 5:
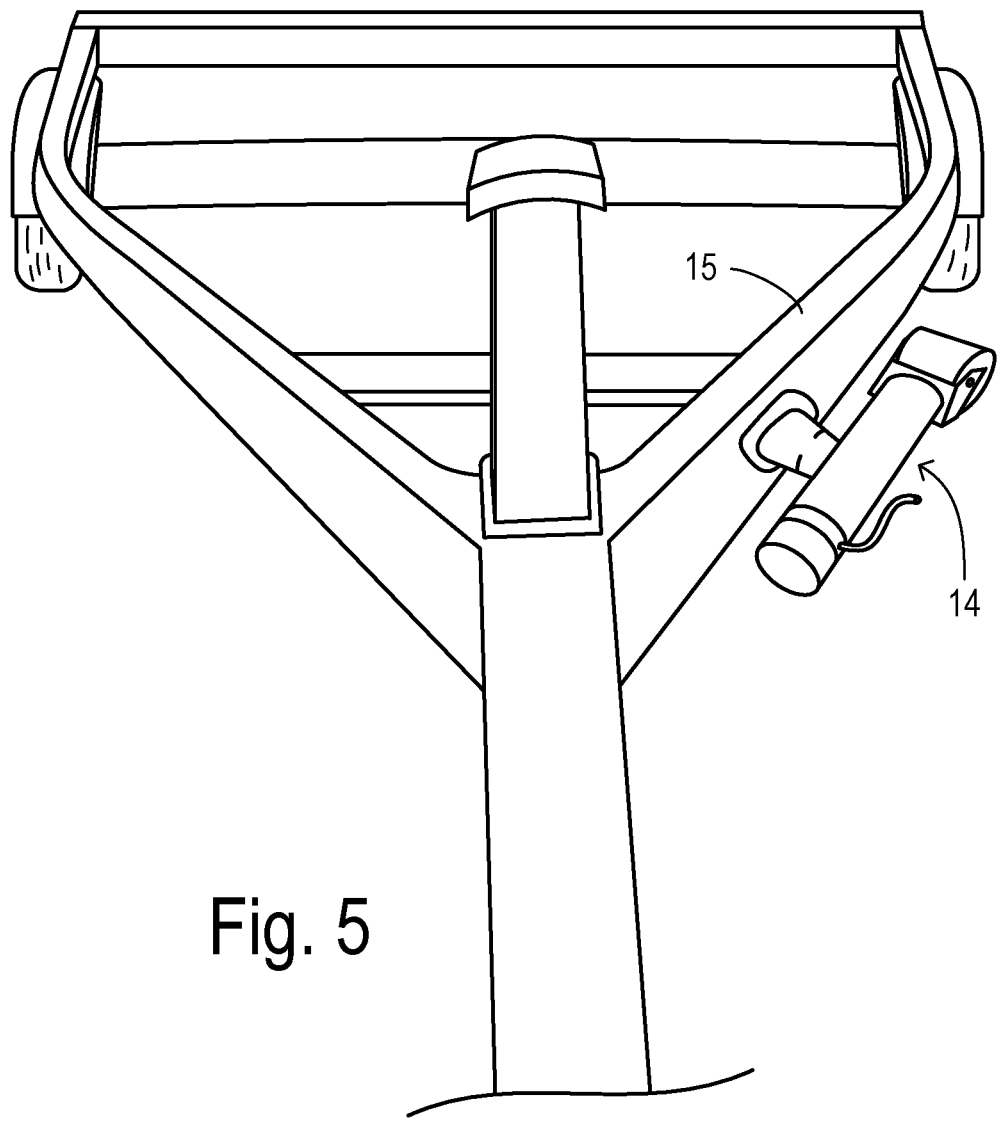
FIG. 5 is a camera view of the trailer with the drop leg in the retracted position hiding the marking pattern of FIG. 4.
Figure 6:
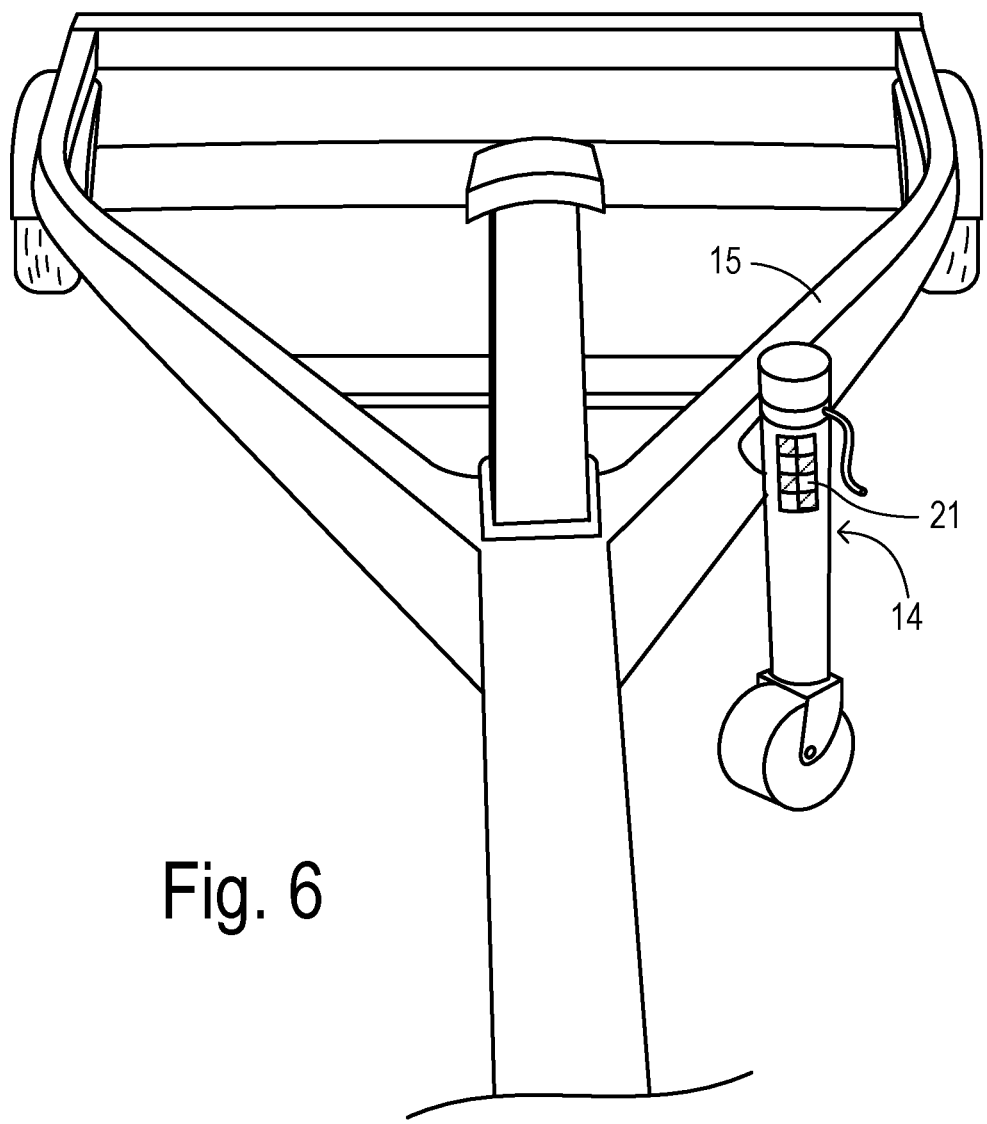
FIG. 6 is a camera view of the trailer and drop leg of FIG. 4 with the marking pattern being visible in the extended position.

In order to enable automatic (i.e., automated) detection of a position of the drop leg, a first embodiment of the invention as shown in FIG. 4 adds a marker 21 on a top, forward-facing surface 20 of drop leg 14. Marker 21 has a predetermined signature pattern adapted for ease of recognition using known image processing techniques. Preferably, marker 21 may be a sticker or other physical media that can be applied by a user, wherein marker 21 has an imprinted pattern with alternating blocks of contrasting colors (e.g., a checkerboard pattern). Surface 20 is selected to be well-placed for an unobstructed view by the backup camera while in the extended (i.e., vertical) position and to be obstructed from view while in the retracted (i.e., horizontal) position. Detectability (i.e., visibility) of marker 21 within the camera field of view is assigned to correspond with the extended position of drop leg 14 for the illustrated embodiment. When drop leg 14 having the marker position as shown in FIG. 4 is moved into the retracted position, then the view from the backup camera is as shown in FIG. 5. In particular, marker 21 is not visible in the camera view of FIG. 5 and, therefore, when pattern recognition is performed on a detection image then the detected state of drop leg 14 is the retracted position (since the extended position which would be revealed by the detection of marker 21 not be detected). Because the predetermined signature pattern is not visible, it would be appropriate to drive the vehicle and so a warning is not triggered. On the other hand, FIG. 6 shows a detection image captured during a time when drop leg 14 is in the extended position, resulting in full visibility of marker 21. When pattern recognition is performed on the detection image, then the predetermined signature pattern is recognized and the driver is warned of the fact that the drop leg is in the extended position.

Figure 7:
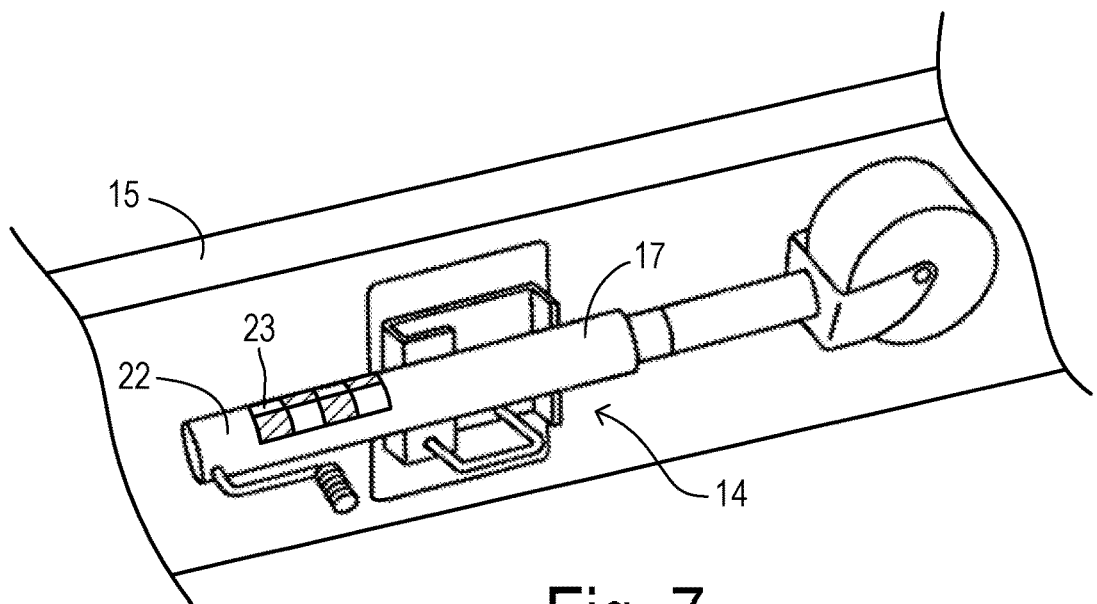
FIG. 7 is a perspective view of a drop leg having a marking pattern applied in a location visible only in the retracted position.

FIG. 7 shows an alternative embodiment wherein a marker 23 is placed on a forward, upper surface 22 of drop leg 14 (determined when drop leg 14 is in the retracted position) such that marker 23 is visible (i.e., falls within the camera field of view) while in the retracted position and is invisible (on a hidden side) while in the extended position. In this embodiment, a warning or other intervention is made whenever the scanning within a detection image fails to detect the predetermined signature pattern at the time when driving is initiated. In another alternative embodiment (not shown), different markers with different predetermined signature patterns and different placements for being uniquely visible depending of the state of the drop leg can be deployed. This would allow for direct detection of each of the extended and retracted positions based on which pattern is visible, thereby avoiding the need to infer one of the positions based on the absence of a signature pattern.

Figure 8:
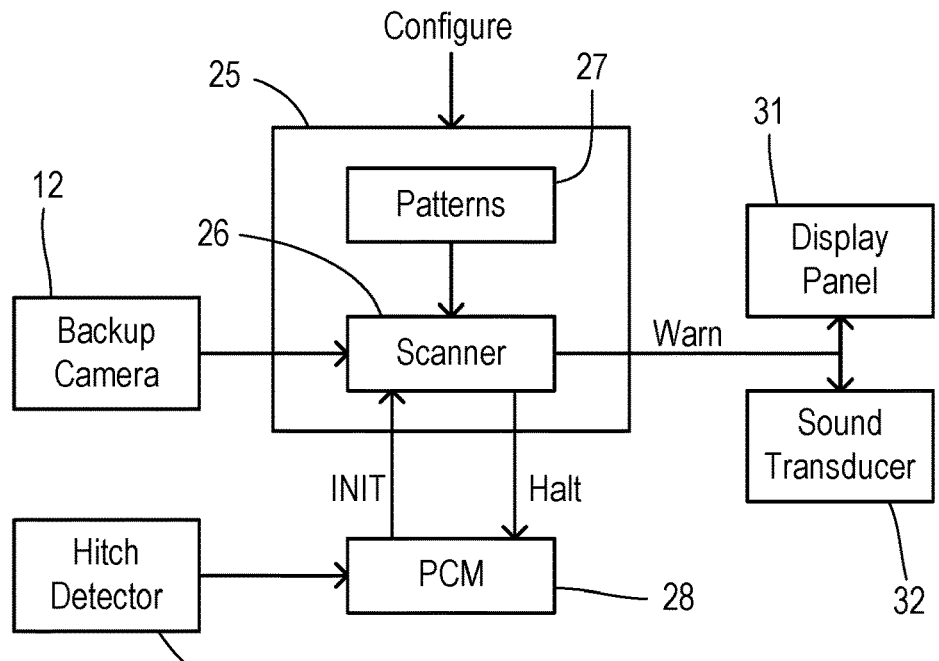
FIG. 8 is a block diagram showing a vehicle apparatus of a preferred embodiment of the invention.

A vehicle apparatus for performing the invention is shown in FIG. 8 wherein backup camera 12 is connected to a controller 25 having an image scanner 26. A pattern memory 27 pre-stores at least one image pattern indicative of an extended position or a retracted position of the drop leg. Pattern memory 27 is pre-configurable according to various embodiments of the invention. A configuration phase may include designation of predetermined signature patterns being mounted on a drop leg in association with an indication of the retracted/extended drop leg position for which the signature pattern will be visible (wherein the signature pattern can be selected from patterns pre-defined by a manufacturer or can be identified from a configuration image captured using the backup camera). The configuration phase can alternatively comprise the collection of other types of configuration images from backup camera 12 according to various states of the trailer and drop leg as described later.

Controller 25 is connected to a powertrain control module 28 or other vehicle control system module to provide an initiation (INIT) signal to controller 25 whenever a driver manipulates a vehicle control element to initiate driving of the vehicle while a trailer is connected. For example, a hitch detector 30 is coupled to controller 28 for detecting the presence of a trailer. Detector 30 may be comprised of an electrical circuit for detecting an interconnection of a wiring harness from a trailer, or may be comprised of an image recognition system using images from backup camera 12 to recognize the presence of a trailer behind the vehicle, for example. Controller 28 may utilize predetermined signals associated with driving activities, such as movement of a transmission gear select lever, an accelerator pedal, or a brake pedal to detect that the driver intends to move the vehicle. When the presence of a trailer and the initiation of driving are both detected, then the INIT signal is provided to controller 25.

In response to the INIT signal, controller 25 activates scanner 26 to receive a detection image from backup camera 12 and to compare the detection image with at least one image pattern from memory 27 in order to detect whether drop leg 14 is in the extended position. If the extended position is detected, then a WARN signal is provided to the driver via a display panel 31 (e.g., text message or blinking light) and/or a sound transducer 32 (e.g., a buzzer or a synthesized spoken warning). In addition, a HALT signal may be provided to vehicle controller 28 in order to inhibit vehicle motion (e.g., preventing movement of the gear select lever out of Park).

Figure 9:
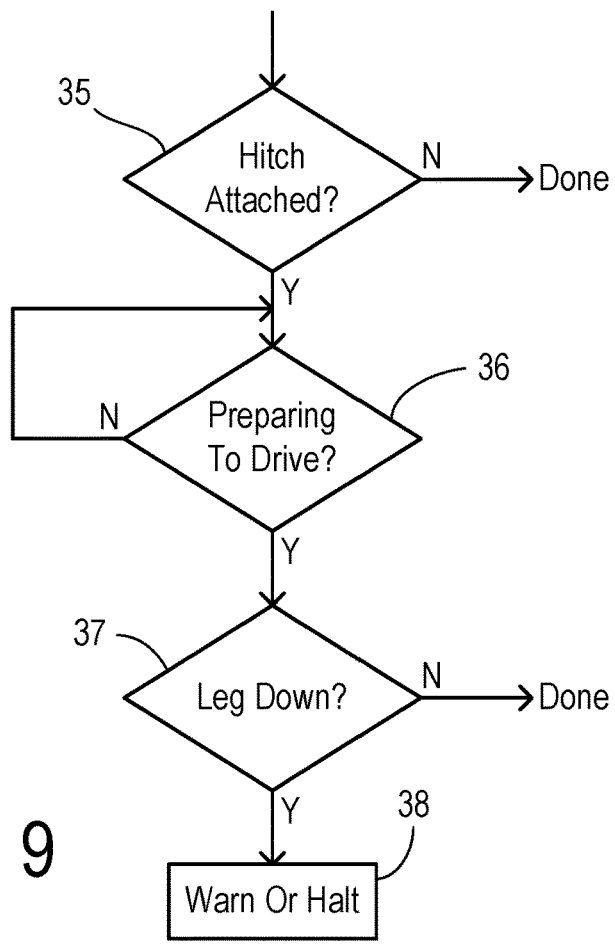
FIG. 9 is a flowchart showing a preferred method of the invention.

Accordingly, a preferred method of the invention is shown in FIG. 9, wherein a check is performed during a start-up of the vehicle to determine whether a hitch is attached in step 35. If a hitch is attached then a check is performed in step 36 to determine whether a driver is preparing to move the vehicle. Once movement is being initiated, then a check is performed in step 37 to determine whether the drop leg is in the extended position. If not, then the method is completed. Otherwise, the driver is warned in step 38, and steps may be taken to halt operation of the vehicle until the drop leg is moved to the retracted position. In addition, step 38 could include the automatic raising of the landing leg in the event that the trailer is automated using a servomechanism that can be activated by a vehicle controller.

Figure 10:
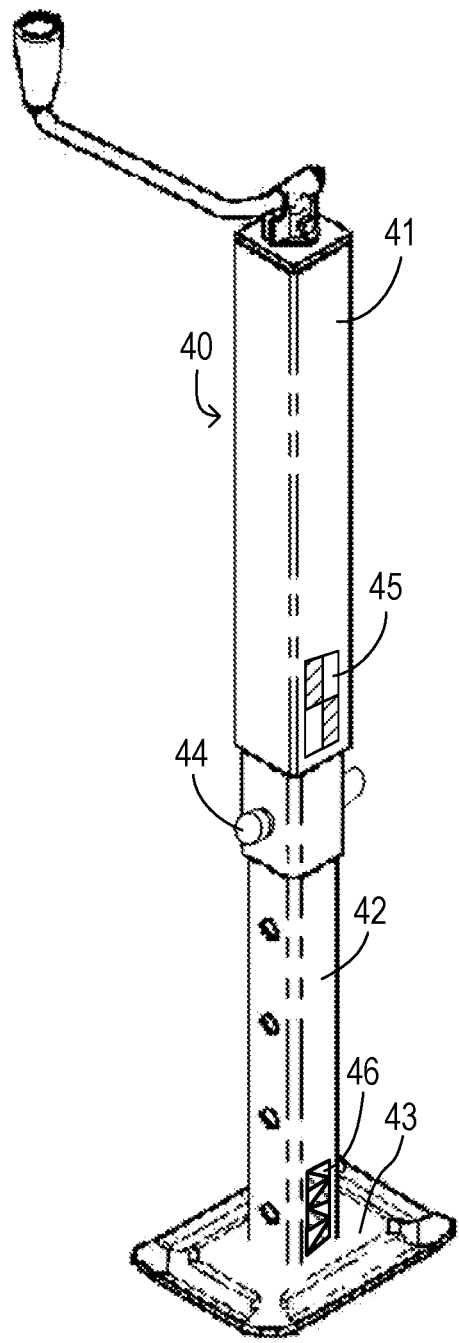
FIGS. 10 and 11 are perspective views of a telescoping drop leg having a pair of marking patterns in the extended and retracted positions, respectively.
Figure 11:
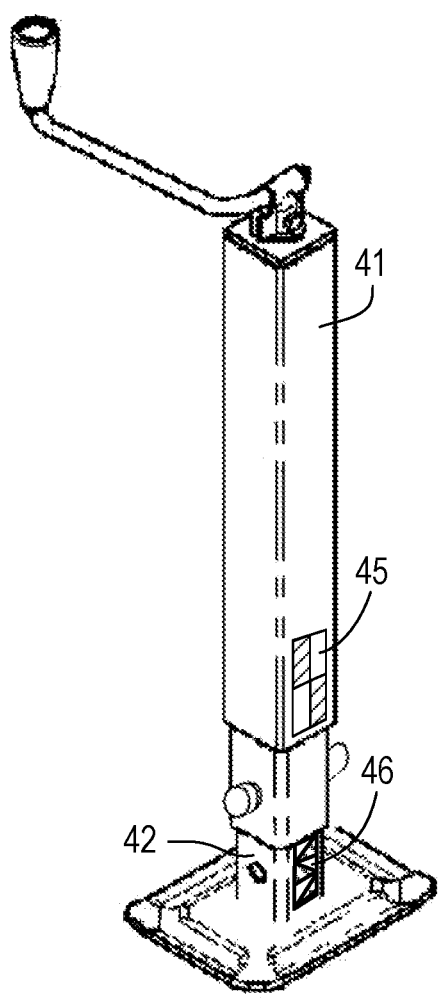

FIGS. 10 and 11 illustrate a drop leg 40 of a type wherein a telescoping action is used to deploy the drop leg rather than a pivot mechanism. Thus, an upper fixed portion 41 contains a telescoping leg portion 42 carrying a footplate 43 for engaging the ground. A locking pin 44 may be inserted through matching apertures to provide a desired length extension, and a rotational handle 47 for an internal linkage may be further provided to control additional upward or downward fine motion control for extending the position of telescoping leg 42.

For differentiating between an extended and a retracted position of drop leg 40, a pair of markers 45 and 46 are placed on fixed portion 41 and telescoping leg portion 42, respectively, of drop leg 40. Thus, a separation distance between markers 45 and 46 is greater while in the extended position shown in FIG. 10 than in the retracted position shown in FIG. 11. In this embodiment, the stored image pattern used to detect whether the drop leg is in the extended or retracted positions may be comprised of an image distance as manifested in a configuration image taken during a configuration phase. The captured configuration image contains drop leg 40 along with markers 45 and 46 when they have been placed by the user into the retracted position according to FIG. 11.

Figure 12:
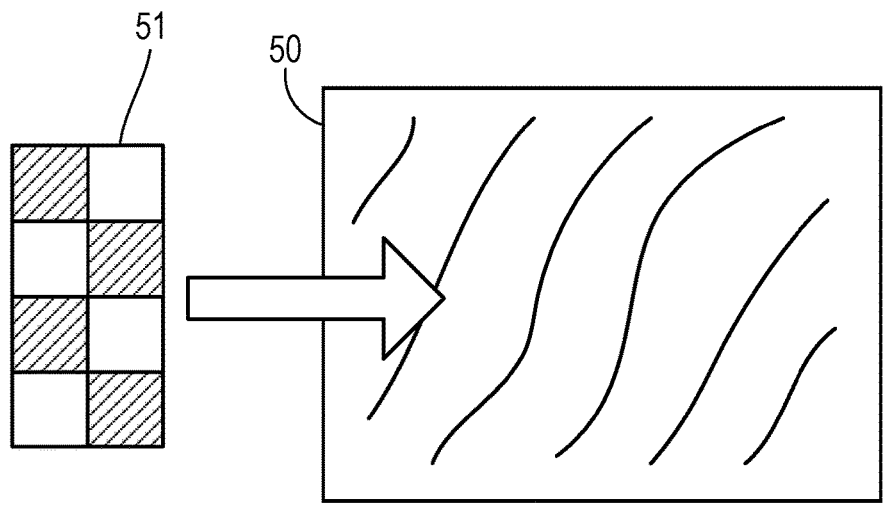
FIG. 12 is a diagram showing comparison of a predetermined marking pattern with a detection image from a backup camera.
Figure 13:
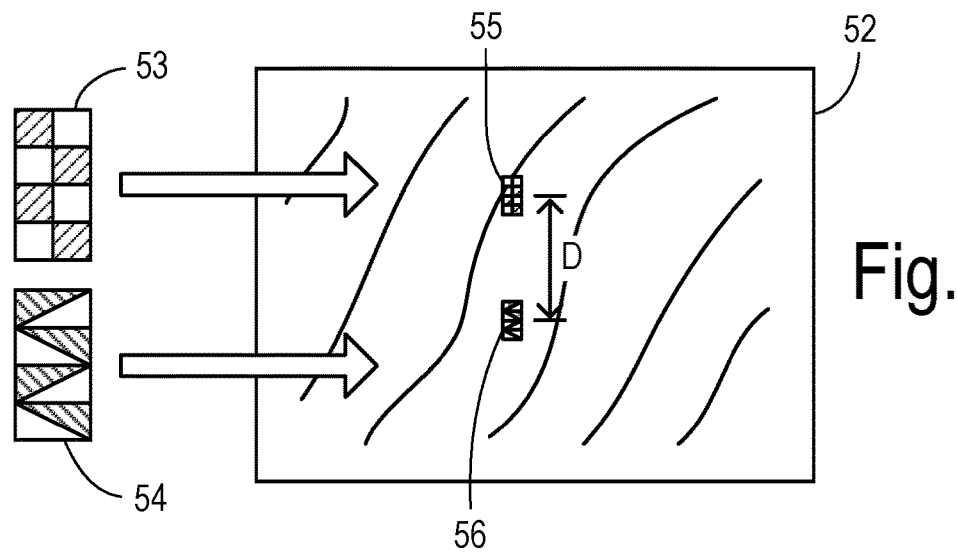
FIG. 13 is a diagram showing comparison of two marking patterns with a detection image.
Figure 14:
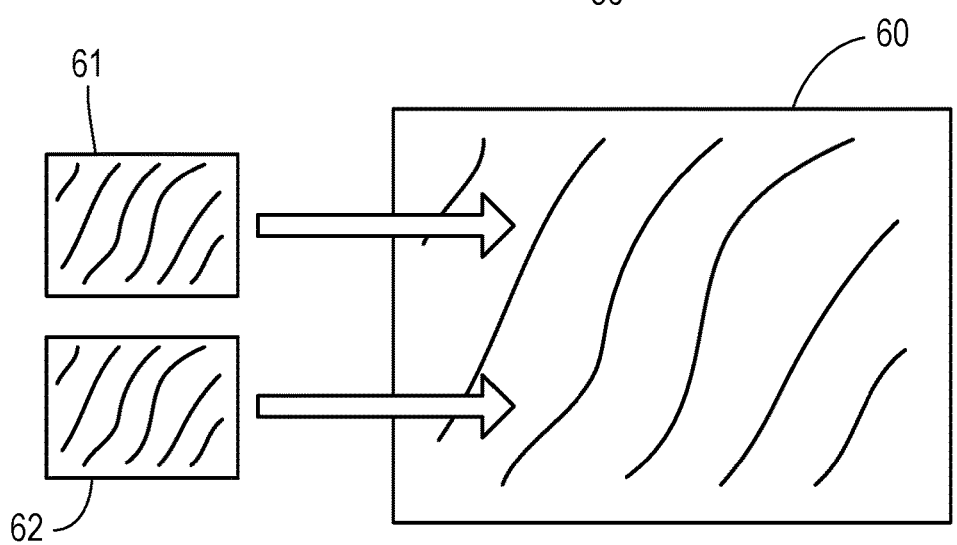
FIG. 14 is a diagram showing comparison of two configuration images with a detection image, wherein the configuration images are obtained with the backup camera at respective times when the drop leg is set to the retracted and extended positions.

Automatic image detection as used in the invention shown in greater detail in FIGS. 12-14.

In the embodiment of FIG. 12, a detection image 50 is shown which has been captured at the time when a hitch is connected to the vehicle and the driver has taken action to initiate movement. In this embodiment, a physical media exists on the drop leg which is marked with predetermined signature pattern 51. During a set-up or configuration phase, pattern 51 has also been designated to correspond with either the retracted or extended position. The image scanning controller compares (i.e., scans) image 50 looking for predetermined signature pattern 51, and it accordingly determines the drop leg position according to the presence or absence of pattern 51 within image 50.

FIG. 13 shows a detection image 52 according to an embodiment wherein the pattern memory has been configured according to a telescoping drop leg. The drop leg is marked by distinct predetermined signature patterns 53 and 54 on the stationary and moving portions of the drop leg. Matching image areas 55 and 56 within detection image 52 that are detected during image scanning define a distance D between predetermined reference points within patterns 53 and 54. During the initial set-up or configuration phase, a configuration image that was obtained showing the drop leg in the retracted position similarly defines a retraction distance between the signature pattern reference points. Distance D from detection image 52 is compared to the retraction distance, and the extended position is detected whenever distance D is greater than the retraction distance.

FIG. 14 shows an embodiment using a more complex image matching capability. The pattern memory is configured using at least two configuration images 61 and 62 during a set-up phase, e.g., an extended configuration image with the drop leg in the extended position and a retraction configuration image with the drop leg in the retracted position. Configuration images 61 and 62 are compared with a detection image 60. The comparison determines the extended/retracted position of the drop leg according to which of the configuration images most closely matches the detection image. Image scanning in this embodiment would require more sophisticated pattern recognition capabilities for detecting the drop leg position, which may increase the cost of a corresponding electronic module, but it is still within known image processing capabilities.

What is claimed is:

1. Vehicle apparatus adapted for towing a trailer with a retractable drop leg, comprising:
    a backup camera capturing a detection image with a field of view including the trailer;
    a vehicle controller detecting an initiation of driving with the trailer being connected;
    a pattern memory prestoring at least one image pattern indicative of an extended position or a retracted position of the drop leg;
    an image scanner receiving the detection image when the initiation of driving is detected, wherein the image scanner compares the detection image and the at least one image pattern to detect whether the drop leg is in the extended position; and
    a notification device responsive to the image scanner to alert a driver if the extended position is detected;
    wherein the pattern memory and image scanner are configurable by a user to capture a configuration image from the camera in which a pair of predetermined signature pattern bodies are affixed to the drop leg in a retracted position, wherein a first predetermined signature pattern body is affixed to a stationary portion of the drop leg and a second predetermined signature pattern body is affixed to a telescoping portion of the drop leg resulting in the predetermined signature pattern bodies being separated in the configuration image by a retraction distance, and wherein the image scanner detects the extended position when an image distance between the predetermined signature pattern bodies in the detection image is greater than the retraction distance.

2. The vehicle apparatus of claim 1 wherein the vehicle controller is responsive to the image scanner to inhibit vehicle motion if the extended position is detected.

3. The vehicle apparatus of claim 1 wherein the notification device is comprised of a visual indicator on a display panel.

4. The vehicle apparatus of claim 1 wherein the notification device is comprised of a sound transducer producing an audible warning sound.

5. A method for operating a vehicle towing a trailer with a retractable drop leg, comprising the steps of:
    a user initially selecting a predetermined signature pattern on the drop leg as at least one image pattern;
    the user initially selecting whether the predetermined signature pattern is associated with an extended position or a retracted position of the drop leg;
    capturing a detection image with a backup camera having a field of view including the trailer;
    detecting an initiation of driving of the vehicle with the trailer being connected;
    when the initiation of driving is detected, comparing the detection image with the at least one image pattern to detect whether the drop leg is in the extended position, wherein the at least one image pattern is indicative of the extended position or the retracted position of the drop leg; and
    alerting a driver if the extended position is detected.

6. The method of claim 5 further comprising the step of inhibiting vehicle motion if the extended position is detected.

7. The method of claim 5 further comprising the step of affixing a physical media marked with the predetermined signature pattern to the drop leg to be visible in the detection image in only one of the extended position or the retracted position.

8. The method of claim 5 wherein the step of alerting the driver is comprised of generating a visual indicator on a display panel.

9. The method of claim 5 wherein the step of alerting the driver is comprised of generating an audible warning sound.

10. Vehicle apparatus adapted for towing a trailer with a retractable drop leg, comprising:
    a backup camera capturing a detection image with a field of view including the trailer;
    a vehicle controller detecting an initiation of driving with the trailer being connected;
    a pattern memory prestoring at least one image pattern indicative of an extended position or a retracted position of the drop leg;
    an image scanner receiving the detection image when the initiation of driving is detected, wherein the image scanner compares the detection image and the at least one image pattern to detect whether the drop leg is in the extended position; and
    a notification device responsive to the image scanner to alert a driver if the extended position is detected;
    wherein the pattern memory and image scanner are configurable by a user to select a predetermined signature pattern as the stored image pattern and to select whether the predetermined signature pattern is associated with the extended position or the retracted position.

11. The vehicle apparatus of claim 10 further comprising a physical media marked with the predetermined signature pattern and adapted to be affixed to the drop leg to be visible in the detection image in only one of the extended position or the retracted position.

12. The vehicle apparatus of claim 10 wherein the vehicle controller is responsive to the image scanner to inhibit vehicle motion if the extended position is detected.

13. The vehicle apparatus of claim 10 wherein the notification device is comprised of a visual indicator on a display panel.

14. The vehicle apparatus of claim 10 wherein the notification device is comprised of a sound transducer producing an audible warning sound.

15. Vehicle apparatus adapted for towing a trailer with a retractable drop leg, comprising:
    a backup camera capturing a detection image with a field of view including the trailer;

a vehicle controller detecting an initiation of driving with the trailer being connected;

a pattern memory prestoring at least one image pattern indicative of an extended position or a retracted position of the drop leg;

an image scanner receiving the detection image when the initiation of driving is detected, wherein the image scanner compares the detection image and the at least one image pattern to detect whether the drop leg is in the extended position; and a notification device responsive to the image scanner to alert a driver if the extended position is detected;

wherein the pattern memory and image scanner are configurable by a user to capture an extended configuration image from the camera while the drop leg is in the extended position and a retraction configuration image from the camera while the drop leg is in the retracted position, and to store the configuration images as the image patterns to be compared to the detection image.

16. A method for operating a vehicle towing a trailer with a retractable drop leg, comprising the steps of:

capturing a configuration image from a backup camera having a field of view including the trailer in which a pair of predetermined signature pattern bodies are affixed to the drop leg in a retracted position, wherein a first predetermined signature pattern body is affixed to a stationary portion of the drop leg and a second predetermined signature pattern body is affixed to a telescoping portion of the drop leg resulting in the predetermined signature pattern bodies being separated in the configuration image by a retraction distance;

detecting an initiation of driving of the vehicle with the trailer being connected;

capturing a detection image with the backup camera;

when the initiation of driving is detected, comparing the detection image with at least one image pattern to detect whether the drop leg is in the extended position, wherein the at least one image pattern is indicative of the extended position or the retracted position of the drop leg, and wherein the comparing step detects the extended position when an image distance between the predetermined signature pattern bodies in the detection image is greater than the retraction distance; and alerting a driver if the extended position is detected.

17. The method of claim 16 further comprising the step of inhibiting vehicle motion if the extended position is detected.

18. The method of claim 16 wherein the step of alerting the driver is comprised of generating a visual indicator on a display panel.

19. The method of claim 16 wherein the step of alerting the driver is comprised of generating an audible warning sound.

20. A method for operating a vehicle towing a trailer with a retractable drop leg, comprising the steps of:

a user initiating a set-up phase to capture an extended configuration image from a backup camera having a field of view including the trailer while the drop leg is in an extended position and a retraction configuration image from the backup camera while the drop leg is in a retracted position;

storing the configuration images as image patterns;

detecting an initiation of driving of the vehicle with the trailer being connected;

capturing the detection image with the backup camera;

when the initiation of driving is detected, comparing the detection image with at least one of the image patterns to detect whether the drop leg is in the extended position, wherein the image patterns are indicative of an extended position or a retracted position of the drop leg; and alerting a driver if the extended position is detected.

* * * * *